United States Patent
Haugs et al.

(10) Patent No.: US 6,965,291 B2
(45) Date of Patent: Nov. 15, 2005

(54) CIRCUIT COMPONENT AND TRANSFORMER DEVICE WITH CONTROLLABLE IMPEDANCE AND WITH SYSTEMS EQUIPPED WITH SUCH DEVICES

(75) Inventors: Espen Haugs, Sperrebotn (NO); Frank Strand, Moss (NO)

(73) Assignee: MAGTECH AS, Moss (NO)

( * ) Notice: Subject to any disclaimer, the term of this patent is extended or adjusted under 35 U.S.C. 154(b) by 76 days.

(21) Appl. No.: 10/299,684

(22) Filed: Nov. 20, 2002

(65) Prior Publication Data

US 2003/0234698 A2 Dec. 25, 2003

Related U.S. Application Data

(60) Provisional application No. 60/332,569, filed on Nov. 26, 2001.

(30) Foreign Application Priority Data

Nov. 21, 2001 (NO) .......................................... 2001 5690

(51) Int. Cl.[7] .............................................. H01F 27/28
(52) U.S. Cl. ........................ 336/180; 336/184; 336/173; 323/234
(58) Field of Search ................................ 336/180, 184, 336/173, 83, 214, 234, 223; 323/56, 188, 60, 61, 234

(56) References Cited

U.S. PATENT DOCUMENTS

| | | | |
|---|---|---|---|
| 2,284,406 A | | 5/1942 | D'Entremont |
| 2,333,015 A | | 10/1943 | Krämer et al. |
| 2,716,736 A | | 8/1955 | Rex |
| 2,825,869 A | | 3/1958 | Eckert et al. |
| 3,409,822 A | | 11/1968 | Wanlass |
| 3,757,201 A | | 9/1973 | Cornwell |
| 4,163,189 A | * | 7/1979 | Smutny ....................... 323/250 |
| 4,210,859 A | * | 7/1980 | Meretsky et al. ........... 323/331 |
| 4,393,157 A | | 7/1983 | Roberge et al. |
| 5,404,101 A | | 4/1995 | Logue ................... 324/207.17 |
| 5,672,967 A | | 9/1997 | Jensen et al. |
| 5,936,503 A | | 8/1999 | Holmgren et al. |
| 6,232,865 B1 | | 5/2001 | Zinders et al. |
| 6,307,468 B1 | | 10/2001 | Ward, Jr. ..................... 340/505 |
| 6,429,765 B1 | | 8/2002 | Valdemarsson et al. ..... 336/212 |

FOREIGN PATENT DOCUMENTS

| | | | |
|---|---|---|---|
| DE | 100 62 091 C1 | | 7/2002 |
| NO | 2000 2652 | * | 5/2000 |
| SU | 441601 | | 6/1975 |
| SU | 877631 | | 10/1981 |
| WO | 94/11891 | | 5/1994 |
| WO | 97/34210 | | 9/1997 |
| WO | 98/31024 | | 7/1998 |
| WO | WO 01/90835 A1 | * | 11/2001 |

OTHER PUBLICATIONS

International Search Report, PCT/NO 02/00434, Mailing Date Mar. 4, 2003.

(Continued)

*Primary Examiner*—Lincoln Donovan
*Assistant Examiner*—Jennifer A. Poker
(74) *Attorney, Agent, or Firm*—Kirkpatrick & Lockhart Nicholson Graham LLP (57) ABSTRACT

A circuit component (L1) with controllable impedance, includes a body (1) of a magnetizable material, a main winding (A1) wound round the body (1) about a first axis and a control winding (A2) wound round the body (1) about a second axis, at right angles to the first axis, where the main winding (A1) is arranged for connection to a working circuit in which the circuit component (L1) is to be employed and the control winding (A2) is arranged for connection to a control unit for controlling the impedance in the working circuit. The circuit component or a similar transformer device can be included in various current and voltage regulating devices.

11 Claims, 7 Drawing Sheets

OTHER PUBLICATIONS

International Search Report, PCT/NO 01/00217, Mailing Date Aug. 31, 2001.

Norwegian Search Report, Patent Appl. No. 2001 5689, Mailing Date Jul. 10, 2002.

Norwegian Search Report, Patent Appl. No. 2000 2652, Mailing Date Apr. 30, 2002.

Norwegian Search Report, Patent Appl. No. 2000 2652, Mailing Date Nov. 12, 2002.

* cited by examiner

CIRCUIT COMPONENT AND TRANSFORMER DEVICE WITH CONTROLLABLE IMPEDANCE AND WITH SYSTEMS EQUIPPED WITH SUCH DEVICES

CROSS REFERENCE TO RELATED APPLICATIONS

This application is claims the right to priority based on Norwegian Patent Application No. 20015690, filed Nov. 21, 2001 and claims the benefit of U.S. Provisional Application No. 60/332,569, filed Nov. 26, 2001, the contents of which are incorporated herein by reference.

FIELD OF THE INVENTION

The invention relates to a circuit component with a controllable impedance of the type described in PCT/NO001/00217.

BACKGROUND OF THE INVENTION

In the past, series compensation in transmission lines has been implemented by means of a thyristor-controlled or thyristor-connected series capacitor. However, these approaches are complex and costly because both a thyristor group and corresponding control devices are required. Similarly, past shunt compensators for transmission lines have also required the use of controlled thyristors, e.g., thyristor-controlled reactors.

Historically, earth fault current limiting was accomplished in electric power circuits by use of mechanically-adjusted reactors, e.g., Peterson coils. This approach required constant regulation of the reactor which is unwieldy because mechanical adjustment is required.

SUMMARY OF THE INVENTION

The present invention overcomes the drawbacks of the prior art providing a controllable magnetic device that can be applied in a wide variety of circuits including regulating devices.

In one aspect, a circuit component includes a controllable impedance including a body of magnetisable material, a main winding wound around the body about a first axis, and a control winding wound around the body about a second axis at right angles to the first axis. The main winding is arranged for connection to a working circuit in which the circuit component is to be employed and the control winding is arranged for connection to a control unit for controlling the impedance in the working circuit.

In another aspect, a transformer device includes a body of a magnetisable material, a primary winding wound around the body about a first axis, and a control winding wound around the body about a second axis, at right angles to the first axis. The primary winding is arranged for connection to a primary working circuit in which the transformer device is to be employed. The control winding is arranged for connection to a control unit for controlling the transformer's transformation state. A secondary main winding is also wound about the first or the second axis and is also arranged for connection to a secondary working circuit.

BRIEF DESCRIPTION OF THE DRAWINGS

FIG. 9 is a schematic diagram of a circuit component installed in a current limiting circuit according to an embodiment of the invention.

DETAILED DESCRIPTION

In the said patent application a circuit component is described comprising a body of magnetisable material, a main winding that is wound round the body about a first axis and a control winding that is wound round the body about a second axis. By altering the current in the control winding it will be possible to change the circuit component's reluctance and thereby the impedance independently of frequency variations in the circuit in which the main winding is connected.

In one aspect, the invention therefore involves providing a circuit component with controllable impedance, where the impedance control is implemented by means of a control current. A major advantage of the invention is that it does not require movable parts or complicated circuits for controlling the impedance value.

Figure 1A:
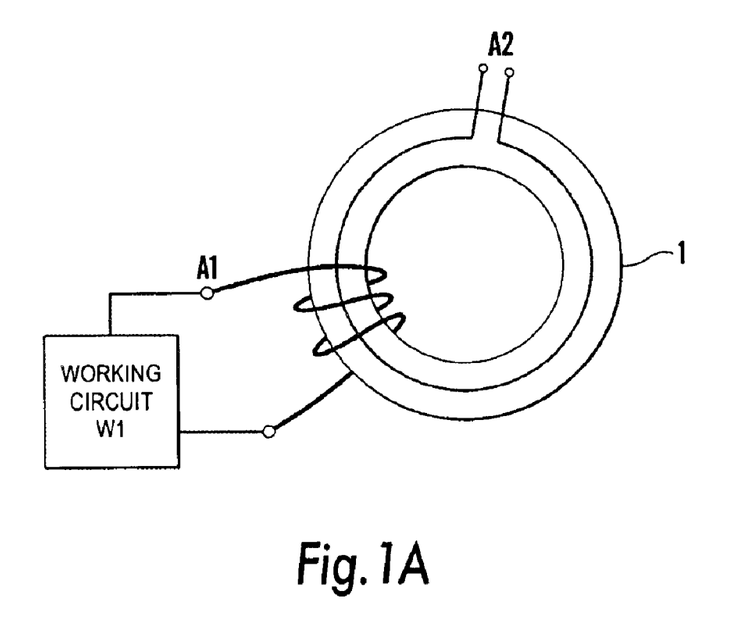
FIG. 1A illustrates an embodiment of a controllable magnetic device.
Figure 1B:
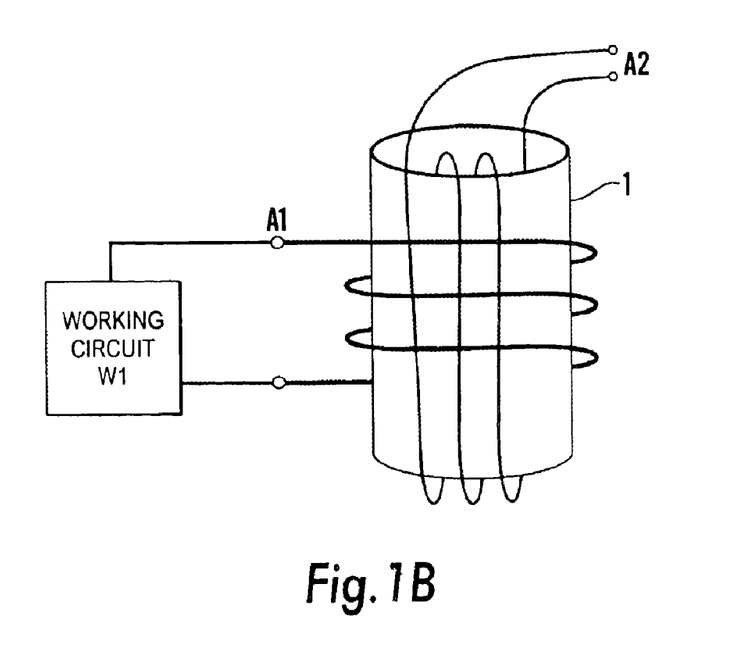
FIG. 1B illustrates another embodiment of a controllable magnetic device.

The principle behind the invention is illustrated in FIG. 1. In this figure there is illustrated a body 1 of a magnetisable material, which may be ferrite or iron or other suitable magnetisable materials. Around the body 1 is wound a main winding A1, which will be connected to a working circuit W1 at the point where a variable impedance requires to be introduced. A1 is wound in a first direction, which in the case illustrated in FIG. 1A coincides with the body's 1 circumference. A second winding, the control winding A2, is also wound around the body 1, but the winding axis is at right angles (perpendicular) to the winding axis for A1, thereby largely avoiding transformative connection between A1 and A2, with the only connection taking place within the magnetisable material. In principle the connection will be manifested as a change in the material's $\mu_r$. Based on the known equations: $Rm=1/\mu_r\mu_0 A, L=N^2/Rm$ and $X_L=jwL$, it can be seen that a change in $\mu_r$ will lead to a change in L and thereby in $X_L$.

This characteristic of the invention is particularly useful with regard to regulation, which at the present time is carried out by means of power electronics.

Figure 2:
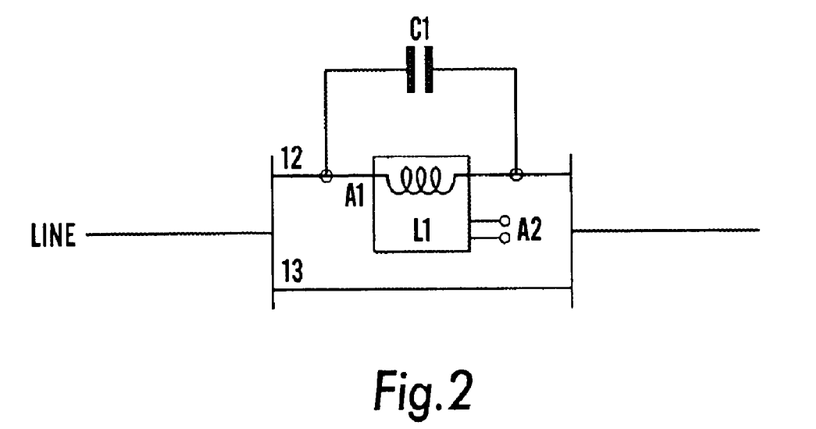
FIG. 2 is a schematic diagram of a circuit component installed in a transmission line according to an embodiment of the invention.

A first application of the circuit component according to the invention is for series compensation in transmission lines. Referring to FIG. 2, series compensation is employed in the case of a power line 12 where connection of various equipment causes the line's total impedance to have an excessively high inductive factor. In order to compensate for the inductive factor, capacitors C1 are inserted. The component according to the invention L1 will then be connected in series to the line 12 where the compensation is to be performed (i.e. the main winding A1 in the component L1 is connected in series to the line 12). At the same time the component L1 will be connected in parallel to a capacitor or a capacitor battery C1. By means of the control winding A2 in L1 it will be possible to control the component's L1 impedance from a very low value (where the current in the line 12 passes through the component L1 and not through the capacitor C1) to a high value (where the current in the line 12 largely passes through the capacitor C1). A second application of series compensation is in order to change the impedance value for a transmission line and thereby control power flow between several parallel lines. In the case illustrated in FIG. 1 it will be possible by means of the component L1 according to the invention to control the impedance in the line 12 and thereby the load distribution between the lines 12 and 13. According to the prior art it is possible by this means to perform load flow regulation (current limiting or redistribution of power flow) and stability control.

According to the prior art a series compensation of this kind is carried out by means of a thyristor-controlled or thyristor-connected series capacitor (CSCS,TSSC). A thyristor group and control devices are therefore required in order to activate the different thyristors. This is both cumbersome and expensive.

The invention also relates to a system for controlling the impedance of a transmission line. In one embodiment, a system for series compensation of transmission lines is provided.

Figure 3:
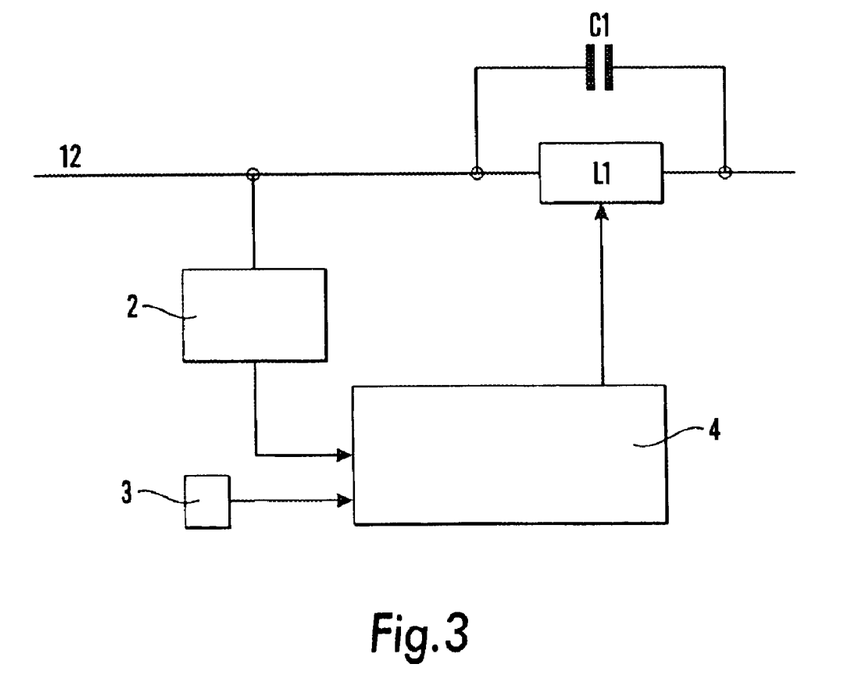
FIG. 3 is a block diagram of a circuit component installed in a transmission line according to another embodiment of the invention.

As shown in FIG. 3, an embodiment of the invention comprises a measuring unit 2 for measuring parameters concerning the line's operation (U, I cos φ, P, Q, S, f), a processing unit with inputs and outputs where a first input is connected to the measuring unit so that the results of the measurement are transmitted to the processing unit 4, a second input is connected to an input unit 3 for input of desired values, and at least one output, where the output signal is converted to a current control signal with a desired frequency (this current may be direct current or alternating current) and intensity, and a circuit component with controllable impedance comprising a main winding for connecting to the transmission line and a control winding for connecting to the processing unit, with the result that the processing unit controls the component's impedance on the basis of the ratio between the measurement results and the desired values.

It is also possible to implement the invention as an "open loop" control circuit where the impedance value is regulated on the basis of desired values without any feedback for measurement values.

A simplified block diagram for the invention is illustrated in FIG. 3.

The system, shown in FIG. 3, comprises a measuring unit 2 for connecting to a transmission line 12, which has to be series compensated, and which will measure the line's operating parameters, such as voltage, current, cos φ. The measured values are transmitted to a processing unit 4, which in an embodiment of the invention is also fed with desired values. Based on the input values the processing unit computes a desired value for the impedance of the component L1 and thereby the necessary control current value that will be applied to the control winding A2 in the component.

Thus the invention constitutes a controllable series reactor that may be employed in combination with a series battery.

The invention has great utilitarian value since it will lead to increased network utilisation (increased load limits) as a result of the ability to regulate power flow (in normal operation or after a fault), or as a result of increased stability limits.

With regard to the output of the circuit component, the maximum output may preferably be of the order of 3000 A, with an impedance of 10–50 ohm.

Regarding regulation requirements for the system, linear control of the series inductance will be needed. The regulating system (which in the described example is provided in the processing unit 4) should be able to follow power changes with a frequency of up to 10 Hz if the unit is to be used for stability control. If it is to be used for compensation of subsynchronous resonance it will have to be raised to 30–50 Hz.

As regards protection requirements when using the system, traditional impedance distance protection will be replaced by "wave protection". If a series battery is used, this will result in the need for metal-oxide diverters (MOD).

As far as system losses are concerned, the stationary losses should be small but this is a minor consideration since the component's total utility value is high. One of the advantages of the system is that it involves a single component with exceptionally low operating costs.

Figure 4:
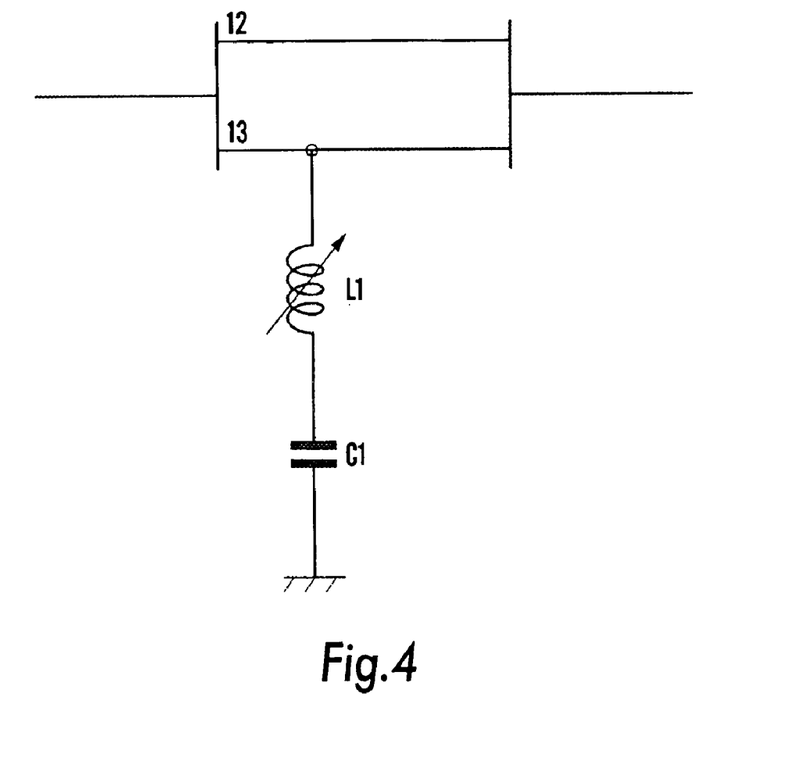
FIG. 4 is a schematic diagram of a circuit component installed in transmission line shunt compensator according to a further embodiment of the invention.

A second application of the circuit component according to the invention is as a shunt compensator in transmission lines, i.e. as a controllable shunt reactor possibly in combination with a shunt battery. According to the prior art this kind of shunt compensation is performed by means of thyristor-controlled reactors (TCR), with all the drawbacks this entails. This application of the invention is illustrated in FIG. 4.

According to this embodiment of the invention the shunt compensation is implemented by means of a circuit component L1 with a main winding A1, which is connected on one side to a transmission line 13 and on the other side is connected to a capacitor C1. The capacitor C1 in turn is connected to earth. The compensation is carried out by changing the impedance of the circuit component L1 by means of the control winding A2 and thereby changing the total impedance of the series L1-C1. The total impedance for the series connection will therefore vary from purely inductive (high value of impedance for the component L1) to zero (series resonance between L1 and C1) and thereafter to purely capacitive (low value of impedance for the circuit component L1). At the same time it will be possible to perform voltage regulation by means of this device, where an unacceptably high voltage in the line will be able to be compensated by increasing the total series impedance for the component and the capacitor and vice versa for an unacceptably low voltage.

Thus in a second embodiment, the system according to the invention comprises a system for shunt compensation, with a measuring unit, a processing unit and a controllable circuit component, where the main winding A1 is arranged for connection in parallel with transmission line 13, and where the system further comprises a capacitor or a capacitor battery C1 connected in series with the circuit component's L1 main winding A1 for shunt compensation of the transmission line 13.

The function of this embodiment of the invention will be reactive compensation and voltage regulation in the transmission line.

It will lead to increased network utilisation (increased load limits) as a result of better voltage regulation (in normal operation or after a fault) and reactive reserve, or also as a result of increased limits with regard to the voltage stability.

With regard to output for the shunt reactor, this will be of the order of 80–150 MV Ar (300 kV, 420 kV). The requirements for regulation of the processing unit will be similar to those for an SVC unit (band width 10–20 Hz).

This system has no special protection requirements, which means that standard conductors (MOA) can be used.

As far as losses are concerned, these will correspond to or be lower than those for ordinary reactors, i.e. reactors that cannot regulate the impedance with iron core. Control current loss will come in addition (3 %). It is most relevant to compare this aspect of the invention with a traditional thyristor-controlled reactor (TCR).

A third application of the circuit component according to the invention is for earth fault compensation. The prior art in this field comprises the use of a so-called Peterson coil for limiting earth fault current. A Peterson coil is a reactor with an iron core and air gap, which is connected between the network's neutral point and earth. Peterson coils are extremely expensive, in addition to which they have to be adjusted mechanically. The Peterson coil has to be regulated at all times to resonate with the rest of the system to which it is connected. Impedance changes in the system will therefore lead to the need for a new, mechanical adjustment of the coil. This is cumbersome and expensive, and substantially limits the use of such a coil.

Figure 5:
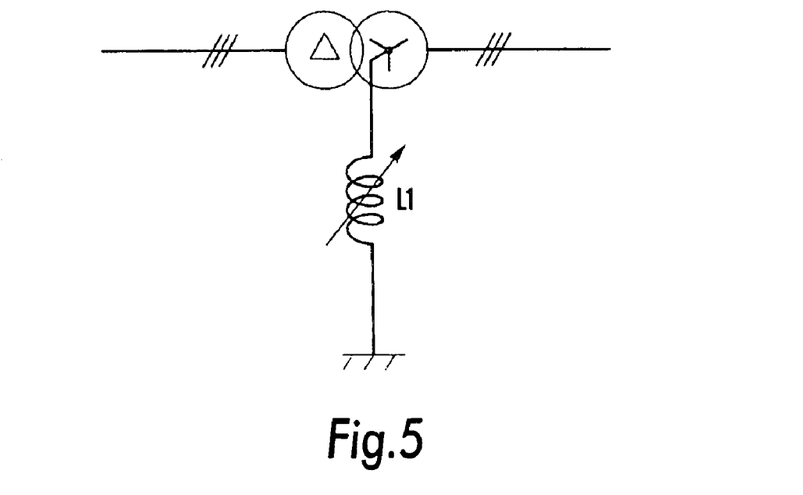
FIG. 5 is a schematic diagram of a circuit component installed in an earth fault compensation circuit according to yet another embodiment of the invention.
Figure 6:
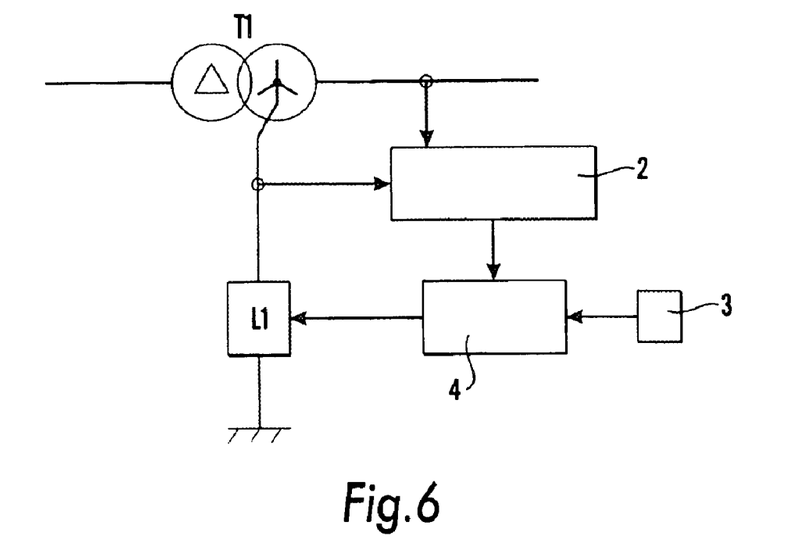
FIG. 6 is a block diagram of a system for providing earth fault compensation according to the embodiment shown in FIG. 5.

The said application of the invention is illustrated schematically in FIGS. 5 and 6. FIG. 5 illustrates a three-phase converter where the primary windings are connected in delta configuration while the secondary windings are connected in radial configuration. The circuit component L1 according to the invention is therefore arranged between the radial configuration's zero point and earth. By changing the impedance of the circuit component L1 it will be possible to control the earth fault back or return current.

Referring now to FIG. 6, the invention also comprises a system for earth fault compensation, i.e. for regulating earth fault impedance comprising a measuring unit 2 for measuring earth fault back or return current together with other parameters for an electrical component T1, a processing unit 4 with at least one input and one output, where the input is connected to the measuring unit 2, and in which processing unit the measurement values are compared with desired values, supplied via the input unit 3, -for earth fault back current values in order to derive an output signal constituting a control current signal, and a circuit component L1 with controllable impedance with a main winding A1 for connecting between the component T1 and earth and a control winding A2 for connecting to the processing unit 4, with the result that the control current signal is fed to the control winding A2 from the processing unit 4, thereby controlling the processing unit 4 component's L1 impedance and earth fault current on the basis of the ratio between the measurement results and the desired values.

As regards the output of this system, this will preferably be up to 200 A.

This embodiment has no special protection requirements, and the losses will not be important since the voltage across the circuit component will normally be low.

A fourth application of the circuit is as a filter, for example as shunt or series compensation with very rapid regulation.

This rapid regulation will be achieved by simply providing a rapid change in the control current.

Figure 7:
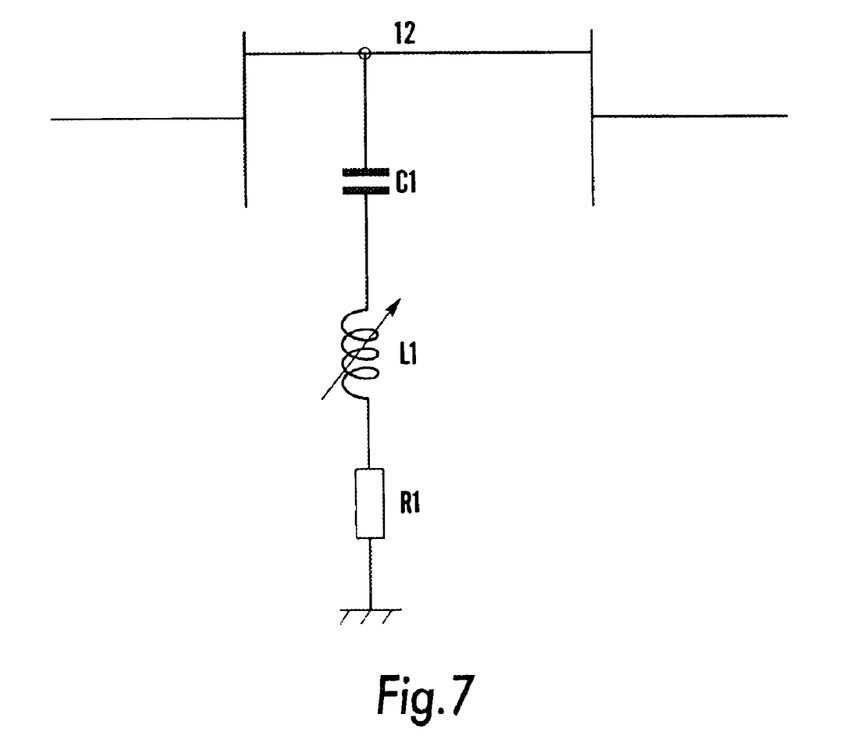
FIG. 7 is a schematic diagram of a circuit component installed in a filter according to a still further embodiment of the invention.
Figure 8:
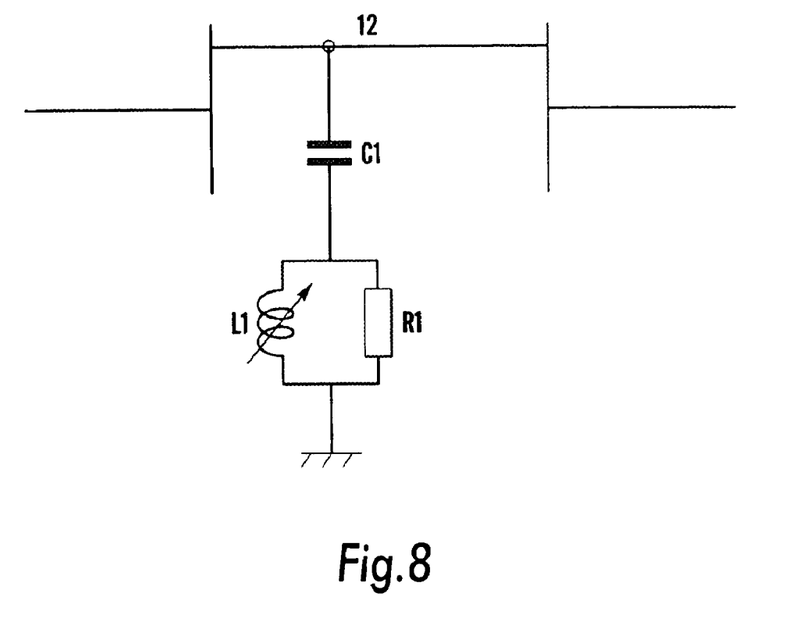
FIG. 8 is a schematic diagram of a circuit component installed in a filter according to yet another embodiment of the invention.

According to this embodiment the invention will comprise a filter (FIG. 7 band-pass filter, FIG. 8 for high-pass filter) comprising a shunt or series compensator with a main winding for connecting to the main circuit and a control winding for connecting to a control unit. By means of the control current, the circuit component included in the filter will be able to change the filter's characteristics as required simply by changing the characteristics of the control current.

A filter system according to the invention will comprise a filter with a circuit component as mentioned earlier together with a measuring and a processing unit for controlling the component's inductance. The system's function will be compensation in order to reduce harmonic, phase asymmetry and flicker in addition to reactive compensation. The filter can also include a capacitor C1 and resistor R1.

In this application the invention will provide better voltage quality and increased reliability in HVDC converters.

As far as the output requirement is concerned, this will vary depending on where the filter has to be used, but in general it can be said that as a rule it will be of the order of 50–100 MV Ar. The regulation of the system will have to be rapid, viz, preferably from milliseconds to $\frac{1}{10}$ of a second.

The invention will therefore represent an alternative to the known active filters (power electronics-based), passive filters and hybrid solutions.

Figure 9:
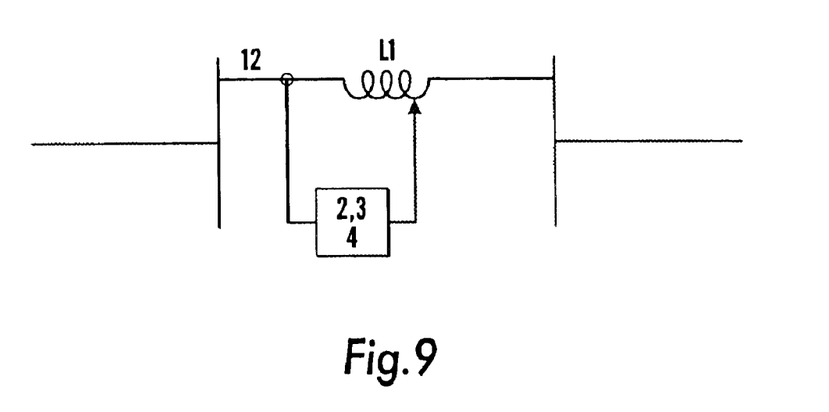

A fifth application of the circuit component is as a current limiter, "generator switch", such as for example a controlled series reactor for current limiting in connection with an electrical load device. This embodiment of the invention is illustrated in FIG. 9. This embodiment is similar on the whole to that illustrated in FIG. 3, except that the control will be exclusively conducted on the basis of desired current values. Thus the invention will also comprise a current limiting system, where it will be possible to provide a switch by means of the circuit component according to the invention. The switch will then be able to move from an open state (i.e. very high impedance) to a closed state (i.e. impedance equal to zero) steplessly by means of the control current. By using a current limiter according to the invention, it will be possible to reduce the current supplied to the load device to a magnitude that can be handled by a circuit breaker. In this manner it will be possible to replace power switches (which are 20 times more expensive than circuit breakers but which on the other hand are capable of interrupting high current values) with circuit breakers in combination with current limiters according to the invention.

In this case the function of the system Will be current limiting by introducing higher or lower impedance depending on the requirement.

With regard to the utilitarian value of this invention, the most important advantage will be that it will lead to d reduction in the need for switch equipment.

In this case the output requirement will be independent according to the purpose for which it is used.

As regards regulation requirements, it will not be necessary to have a closed loop for regulation.

The losses in normal "on mode" will be approximate 0 loss.

The invention will represent an alternative to an Is limiter.

We shall now present possible concrete applications of the invention.

Series Reactor Flesaker-Tegneby

With regard to possible applications in the Norwegian main network, the use as a series reactor may be cited as an example. Limits for transmission capacity from west to east in Southern Norway will often be determined by the capacity of 300 kV Flesaker-Tegneby. The reason for this is that when central lines in Eastern Norway drop out, this will lead to an increased load on the line cable between Flesaker and Tegneby. A controllable series reactor will offer the possibility of reducing the power flow on this connection in a fault situation, thereby permitting an increase in the operative load limits in the Flesaker section.

Traction Power Supply

Power fluctuations are an increasing problem for the traction power supply in Norway and in other Countries employing rotating converters. The converter sets in Norway consist mainly of mechanically connected synchronous motor-synchronous generator sets that supply the traction power network with single-phase alternating voltage of approximately 15 kV and frequency equal to 16⅔ Hz. Stability problems associated with the converter sets are experienced more and more frequently as a result of the fact that the locomotives are becoming more powerful and more rapidly regulating.

The problem is due to an inherently poor damping in the converter sets resulting in power fluctuations on the three-phase side (the network side) and thereby a reduction in the quality of electricity. In addition the fluctuations cause increased mechanical wear on the actual sets.

A controlled series reactor in connection with the transformer that supplies the converter sets from the network side may be a very effective measure for stabilising its operation.

Portable Control Unit for a Variety of Applications

The need for stationary control units in the network will naturally vary as a result of load chances, network development or special temporary requirements. It may also be envisaged that even though there will almost always be a need for a control unit, the best position in the network will change with time. It may therefore be difficult to defend such an investment in the network since one does not know where or for how long there will be a need for the component.

This provides the motivation for developing compact control units, which are transportable, and which have great flexibility with regard to applications. By flexible applications in this context we mean both flexibility regarding control function and connection to the network (different voltage levels, series or shunt connection, etc.).

As a specific example one may envisage a unit mounted on a semitrailer and consisting of controllable reactors, possibly in combination with a capacitor battery, and with the necessary equipment for protection and network connection. The control system must be flexible and configurable, thus enabling the unit to be used for different purposes, such as reactive compensation, active voltage regulation and voltage quality improvement or damping of power fluctuations.

Other concrete examples of applications of the invention will be

Earth current compensation.

Use as a fault current limiter. Possibility of making generator switches cheaper and smaller.

In a second embodiment the invention constitutes a circuit component in the form of a transformer device, i.e. a circuit component where there are two main windings and one, or possibly two control windings, thus permitting the transformer's transformation ratio to be changed by means of one or more control current(s).

Figure 10:
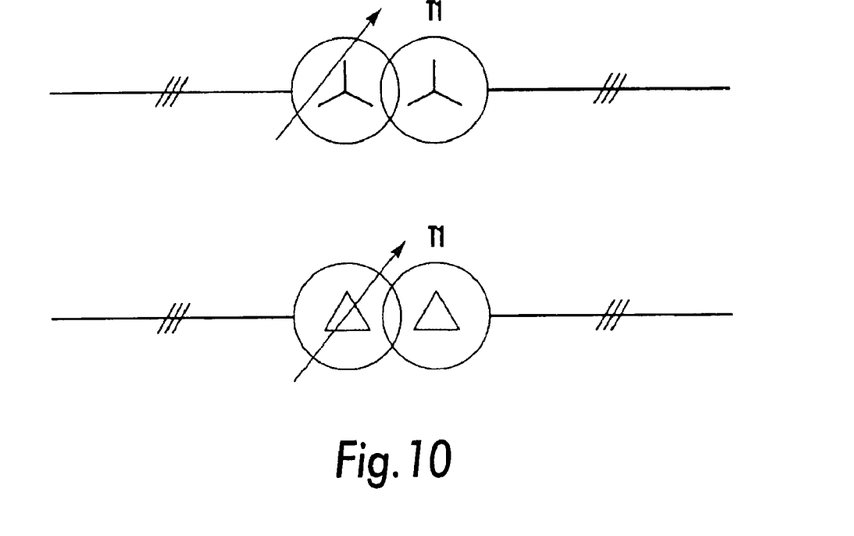
FIG. 10 illustrates two three-phase transformers employing a circuit component according to the invention.
Figure 11:
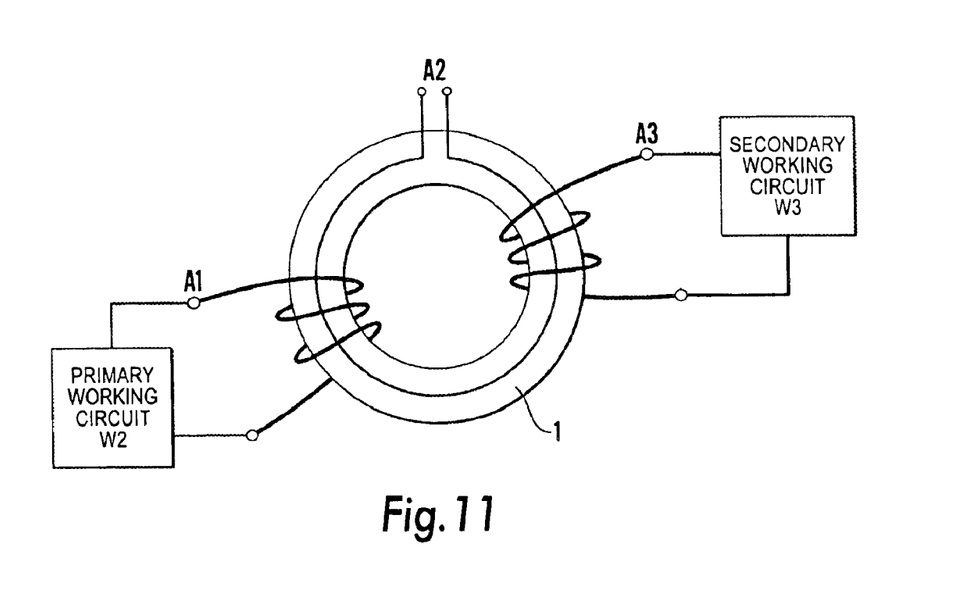
FIG. 11 illustrates yet another embodiment of a controllable magnetic device.

Such an embodiment of the invention is illustrated in FIGS. 10 and 11. FIG. 10 illustrates two three-phase transformers T1 comprising adjustable circuit components. FIG. 11 illustrates the principle behind this embodiment of the invention. Around the magnetisable body 1 is an additional main winding A3 connected in such a manner that the windings A1 and A3 together with the body 1 form a transformer. The control winding A2 is still present and will regulate the transmission ratio of the transformer. It is also possible to wind the main winding A3 around the same axis as the control winding. In the embodiment shown in FIG. 11, the main winding A3 is connected to a primary working circuit W2, and the secondary winding is connected to a secondary working circuit W3.

An important area of application for such a transformer will be new systems for voltage regulation in connection with transformers that will replace the known automatic on-load tap changers. The function will therefore be mainly voltage regulation. The advantages of increased utilisation of transformers with a new "tap changer" are; reliability, maintenance, regulation, equally valid in all kinds of network (distribution, regional and central networks).

Amongst the advantages that will be obtained with the invention is a faster and more precise voltage regulation (simpler with coordinated control).

The output for a circuit component according to the invention will be 200–2000 A.

With regard to regulation requirements, there will be no need for rapid regulation, but a regulation of the order of 10 seconds to 1 minute will suffice.

As far as the losses are concerned, these can be compared to those for conventional transformers.

A major advantage of this embodiment of the invention is that it will lead to much lower maintenance costs compared with today's tap changers.

As alternative solutions, i.e. solutions according to the prior art, we may mention traditional automatic tap changers.

Figure 12:
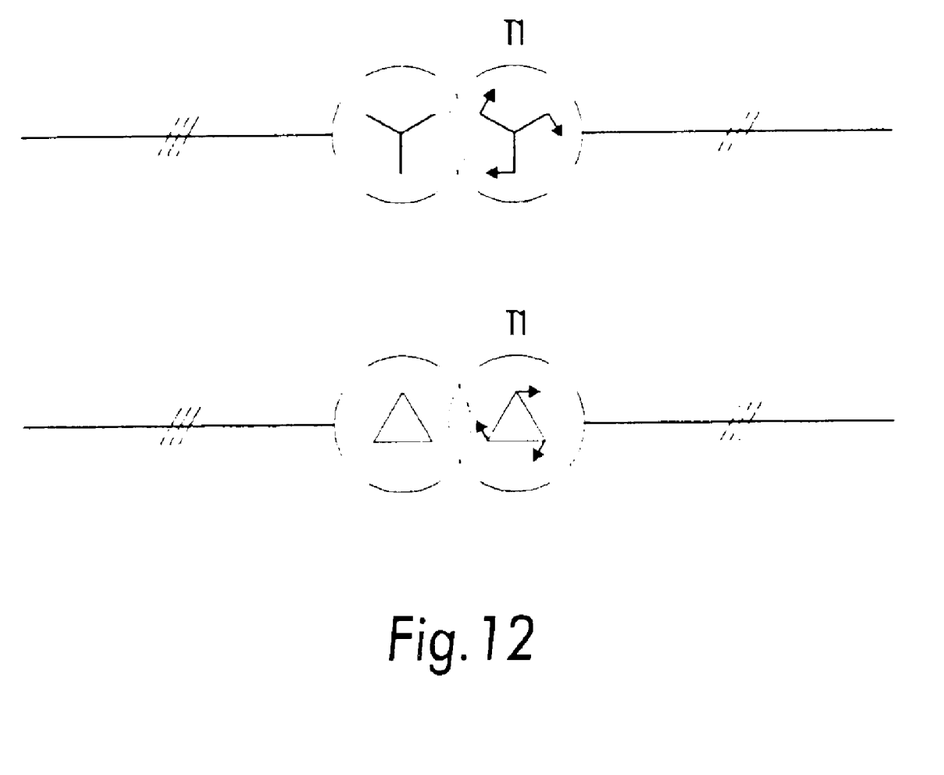
FIG. 12 illustrates a phase angle regulator according to the invention.

This embodiment of the invention can also be employed in connection with a phase angle regulator, which will thereby comprise a transformer component according to the invention. By regulating the control current it will be possible to control the phase shift between the primary and the secondary side. A phase angle regulator of this type is illustrated in FIG. 12. In this case a variety of technical solutions can be envisaged, such as an adjustable series transformer (a series-connected transformer with voltage regulation). The function of the phase angle regulator will be mainly load flow regulation, and possibly stabilization.

The introduction of this embodiment of the invention will lead to increased network utilisation (increased load limits) as a result of the possibility for rapid regulation of load flow (in normal operation or after a fault) and improved stability.

The power transfer will be of the order of 200–1000 MVA (132 kV–420 kV).

Regulation will depend on the function (static power distribution or also dynamic regulation and stabilisation). For pure load flow regulation the band width requirement will be in the area of seconds (0.1–1 Hz).

The protection requirements will be the same as for the series compensation.

As far as losses are concerned, the stationary losses should be low, but what is acceptable for each application will be dependent on the component's total utilisation value.

A special advantage that may be mentioned in association with this embodiment of the invention is greater flexibility in operation of the network.

The alternative solutions according to the prior art will be static series compensators (SSSC), phase distortion transformers, UPFC:

The voltage and phase angle regulator may advantageously form a part of a regulation system according to the invention, where, as mentioned earlier, the system comprises a measuring unit, a processing unit and possibly a unit for manual input of desired values.

All the above-mentioned embodiments of the invention are particularly suitable for use on the seabed or other high-pressure locations.

What is claimed is:

1. A system for controlling the impedance of a working circuit, the system comprising:
    a circuit component with a controllable impedance, the circuit component comprising:
        a body of a magnetisable material;
        a sole winding being in electrical communication with the working circuit, the sole winding wound round the body about a first axis; and
        a control winding wound round the body about a second axis, at right angles to the first axis; and
    a processing unit being in electrical communication with the control winding and the working circuit, the processing unit for controlling the impedance in the working circuit.

2. A series compensator for transmission lines, the series compensator comprising:
    a system according to claim 1.

3. A shunt compensator for transmission lines, the shunt compensator comprising:
    a system according to claim 1.

4. An earth fault compensator, comprising:
    a system according to claim 1.

5. A filter for harmonic current components, phase asymmetry and flicker in electrical power transmission systems, the filter comprising:
    a system according to claim 1.

6. A current limiter or switch device, comprising
    a system according to claim 1.

7. A transformer device comprising a body of a magnetisable material, a primary main winding wound round the body about a first axis and a sole control winding wound round the body about a second axis, at right angles to the first axis, where the primary winding is arranged for connection to a primary working circuit in which the transformer device is to be employed, the control winding is arranged for connection to a processing unit for controlling the transformer's transformation state, and a secondary main winding wound about the second axis arranged for connection to a secondary working circuit.

8. A voltage regulator, comprising:
    a transformer device according to claim 7.

9. A phase angle regulator, comprising:
    a transformer device according to claim 7.

10. A system for controlling an impedance in a working circuit, the system comprising:
    a circuit component with a controllable impedance, the circuit component comprising:
        a body of a magnetisable material;
        a main winding wound around the body about a first axis, the main winding being in electrical communication with the working circuit; and
        a control winding wound around the body about a second axis perpendicular to the first axis;
    a measuring unit for measuring parameters concerning operation of the working circuit, the measuring unit being in electrical communication with the working circuit; and
    a processing unit comprising:
        at least one input connected to the measuring unit; and
        at least one output connected to the control winding,
    wherein the processing unit controls current in the control winding in response to a comparison of a measured value and a desired operating value, and
    wherein the current in the control winding controls the impedance of the circuit component and operation of the working circuit.

11. The system as claimed in claim 10, the comparison further comprising:
    a ratio of a value measured by the measuring unit and the desired operating value.

* * * * *